(12) United States Patent
Clark et al.

(10) Patent No.: US 6,585,021 B2
(45) Date of Patent: Jul. 1, 2003

(54) CD LABEL APPLICATOR KIT

(75) Inventors: Jon R. Clark, Minneapolis, MN (US); George L. Foster, Eden Prairie, MN (US); Richard E. Jewett, Minneapolis, MN (US); Leo W. Spychalla, Cottage Grove, MN (US); John W. Swanson, Mahtomedi, MN (US)

(73) Assignee: Imation Corp., Oakdale, MN (US)

( * ) Notice: Subject to any disclaimer, the term of this patent is extended or adjusted under 35 U.S.C. 154(b) by 37 days.

(21) Appl. No.: 09/887,600

(22) Filed: Jun. 22, 2001

(65) Prior Publication Data

US 2002/0195203 A1 Dec. 26, 2002

(51) Int. Cl.[7] .............................. B65C 1/00; B65C 1/02; B65C 9/26
(52) U.S. Cl. ........................ 156/391; 156/556; 156/580; 156/DIG. 1; 156/DIG. 2
(58) Field of Search .................. 156/391, 581, 156/580, 556, 579, 538, DIG. 1, DIG. 2, DIG. 37

(56) References Cited

U.S. PATENT DOCUMENTS

| | | |
|---|---|---|
| 4,687,536 A | 8/1987 | Hiramatsu et al. |
| 4,921,087 A | 5/1990 | Nakamura |
| 5,421,950 A | 6/1995 | Parrish |
| 5,435,246 A | 7/1995 | Edman |
| 5,543,001 A | 8/1996 | Casillo et al. |
| 5,783,033 A | 7/1998 | Grossman |
| 5,902,446 A | 5/1999 | Casillo et al. |
| 5,925,200 A | 7/1999 | Grossman |
| 5,951,819 A | 9/1999 | Hummell et al. |
| 6,148,891 A * | 11/2000 | Lee ........................ 156/391 |
| 6,149,763 A | 11/2000 | Grossman |
| 6,189,590 B1 * | 2/2001 | Tsay ....................... 156/581 |
| 6,240,990 B1 | 6/2001 | Claussnitzer |
| 6,302,176 B1 * | 10/2001 | Chen ....................... 156/391 |
| 6,321,814 B1 | 11/2001 | Tracy et al. |
| 6,347,654 B1 * | 2/2002 | Koch ....................... 156/391 |
| 2002/0139489 A1 * | 10/2002 | Grogg ..................... 156/582 |

FOREIGN PATENT DOCUMENTS

| | | | |
|---|---|---|---|
| DE | 29608885 | 9/1996 | |
| DE | 29615950 | 10/1996 | |
| DE | 29610120 | 11/1996 | |
| DE | 29703124 | 6/1997 | |
| DE | 19960801 A1 * | 6/2001 | ............. B65C/1/02 |
| GB | 2 290 526 | 1/1996 | |
| WO | WO 9605057 A1 | 2/1996 | |
| WO | WO 9826986 A1 * | 6/1998 | ............. B65C/9/26 |

* cited by examiner

Primary Examiner—Richard Crispino
Assistant Examiner—Sue A. Purvis
(74) Attorney, Agent, or Firm—Eric D. Levinson

(57) ABSTRACT

A CD label applicator kit including a case, a support device and an applicator tool. The case includes a base and cover that provides a label plate. The label forms an opening. The support device includes an alignment post, a hub and a spring. The alignment post is affixed to an outer wall of the cover and extends outwardly through the opening. The hub is slidably disposed about the alignment post and defines a disk-receiving surface. The spring biases the hub to a raised position in which the disk-receiving surface is above the label plate. Finally, the applicator tool forms a central passage sized for selective placement about the alignment post. In one preferred embodiment, the kit includes a label sheet pack and a software disk stored within the base, and a writing utensil secured to the cover.

15 Claims, 5 Drawing Sheets

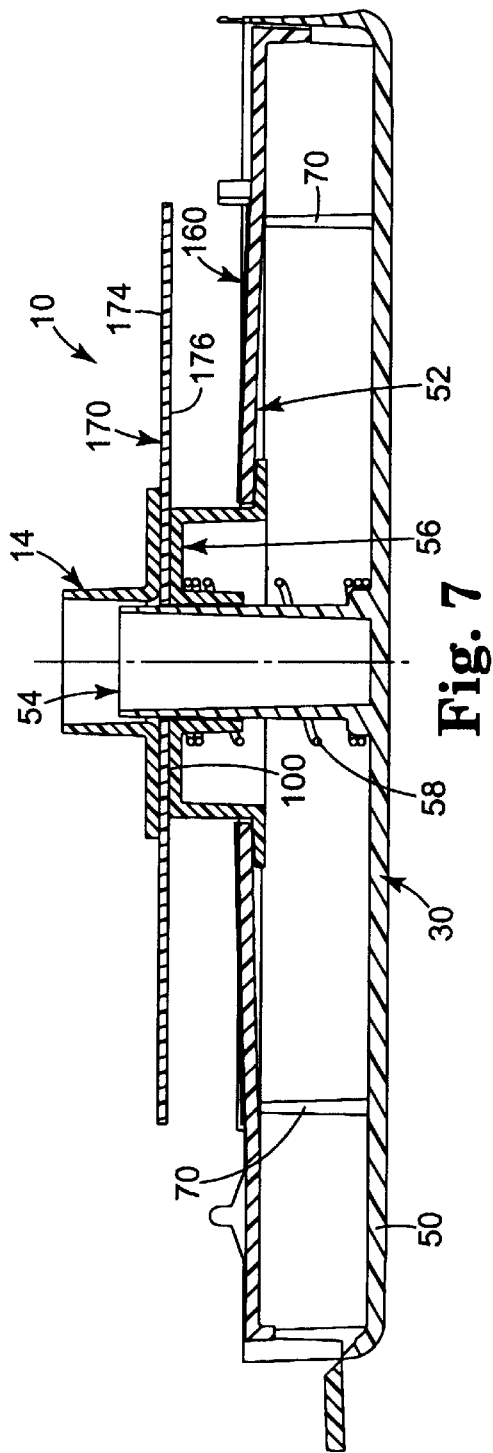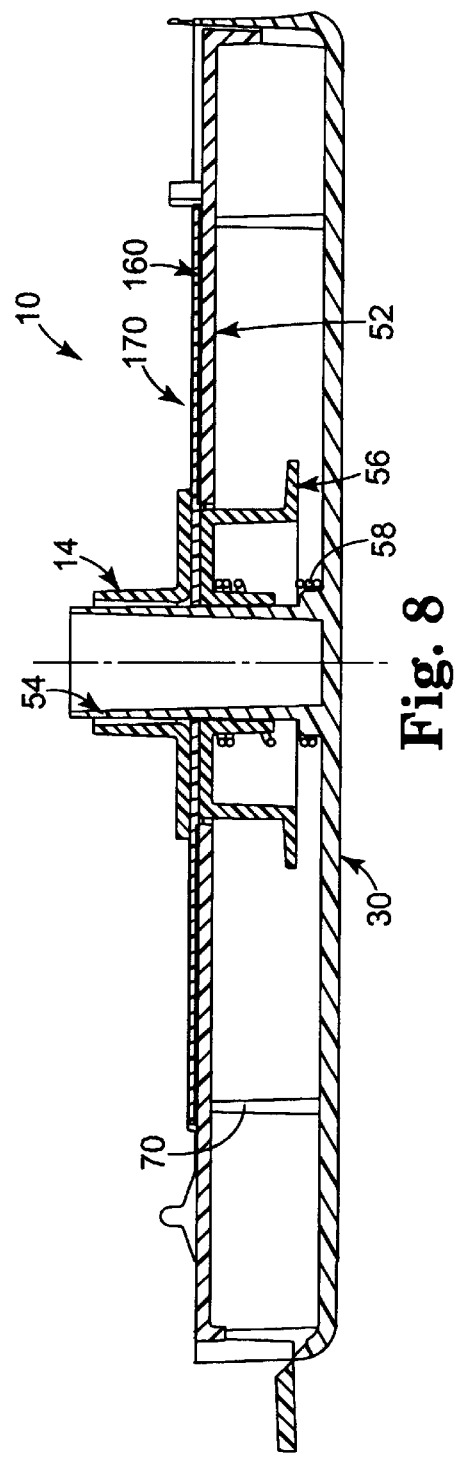

CD LABEL APPLICATOR KIT

BACKGROUND OF THE INVENTION

The present invention relates to an apparatus and method for affixing an adhesive-backed label onto a compact disk (CD). In particular, it relates to a kit conveniently maintaining all necessary CD label applicator components, along with a method of use thereof.

A CD is a highly popular medium used to record and store data for a variety of different applications, including documents, spreadsheets, music, programs, etc. When CD technology was first introduced, only source manufacturers could program individual CDs, and typically did so on a mass production basis. Once formatted with the desired data, the CDs were provided to consumers with some form of printed identification information on an outer surface thereof. Because the CDs were mass produced, it was economically feasible, and from a marketing standpoint highly desirable, to imprint highly stylized identification information into the CD's surface. While this practice is still followed today, more recently consumers have been afforded the ability to "burn" their own CDs. That is to say, it is now possible for a consumer to record desired data onto an otherwise "blank" CD. Once programmed, the user will almost certainly desire to provide some form of identification information at an outer surface of the CD. Unlike mass produced, programmed CDs, a consumer cannot readily imprint identification information into the CD's outer surface.

The most readily accepted technique for providing reference information on a user-formatted CD is via application of an appropriately sized label. In general terms, these labels are adhesive-backed, and are pre-cut to a size corresponding with an outer surface area of a "standard" CD. Thus, the label is cut in the shape of a ring, providing a central hole corresponding in size with the CD center hole.

As might be expected, proper alignment of the label onto the CD is highly important. A misregistered label may lead to improper operation of the CD within a disk drive, for example, due to the CD being unbalanced. As a result, efforts have been made to provide a CD labeling device for properly aligning and subsequently applying the label. These devices are typically relatively large, and thus are not conducive to convenient transport and storage by the user. In addition, some CD label applicator devices include multiple components, one or more of which can easily be misplaced. Additionally, prior art CD label applicators, such as those described in U.S. Pat. Nos. 5,543,001 and 5,951,819, operate on the principle of maintaining the label and the CD in a planar relationship during a label application operation. While viable, these techniques fail to account for the fact that air may become entrapped between the label and the CD surface, possibly leading to formation of a crease or other defect in the so-applied label. This crease or other defect may lead to operation concerns when using the CD within a disk drive.

An additional concern relates to the fact the CD label application device and the unprinted labels are typically sold and maintained separate from one another. As a point of reference, prior to actual application to the CD, consumers desire the ability to print descriptive information onto the label, via an appropriate printer, such as an inkjet or laser printer. To satisfy this demand, unprinted CD labels are typically provided to consumers on 8½×11 inch sheets. Each sheet includes an adhesive-backed label layer and a release liner layer. Due to the size of the sheet, two labels are pattern-cut into the label layer. A software package accompanies the label sheets, and allows the user, via interface with a personal computer otherwise controlling printer operation, to prepare the desired label displays/identification information. The label(s) is then printed, and then peeled off of the release liner. Finally, the so-prepared label is then applied to the CD.

Due to the large size of "standard" CD label sheets, it is virtually impossible to conveniently package unprinted label sheets in combination with an appropriate label applicator. As such, users are required to separately purchase and store the label sheets, related software, and label application device. Unfortunately, a user may not have one or more of these components with them immediately following programming of a new CD. At some later point in time, the user may then forget exactly what data has been stored on the CD, rendering proper identification more difficult. Further, users often desire to handwrite additional identification information onto the applied label. In this regard, only certain types of inks will not readily smudge when applied to the label material. Unfortunately, an appropriate pen/marker may not be available to the user at the time of label application. Notably, currently available label applicators do not allow for convenient mounting or packaging of an appropriate writing utensil to the device.

The recording of data onto blank CDs by individual users is a highly prevalent activity. In this regard, these users almost always desire to apply an identification label to the prepared CD. Unfortunately, existing CD label applicators cannot be conveniently transported, and do not include blank labels, due in large part to the standard label sheet size. Therefore, a need exists for a conveniently sized, CD label applicator kit that promotes consistent label application, maintains all applicator tools in a single enclosure, as well as other auxiliary components such as blank labels and an appropriate writing utensil.

SUMMARY OF THE INVENTION

One aspect of the present invention relates to a CD label applicator kit including a case, a support device, and an applicator tool. The case includes a base and an associated cover. The cover includes an outer wall and a label plate. The label plate is positioned opposite the outer wall in a spaced relationship, and forms an opening. The support device includes an alignment post, a hub, and a spring. The alignment post is affixed to the outer wall and extends outwardly through the opening beyond the label plate. In this regard, the alignment post is configured to be receivable within a center hole of a CD. The hub is slidably disposed about the alignment post and defines a disk-receiving surface. The spring biases the hub to a raised position in which the disk-receiving surface is above the label plate. Finally, the applicator tool forms a central passage sized for selective placement about the alignment post. With this configuration, the kit provides an initial label application state and a final label application state. In the initial label application state, the hub is in the raised position and the applicator tool is assembled over the disk-receiving surface such that the central passage otherwise formed by the applicator tool is positioned about the alignment post. The kit is transitioned from the initial label application state to the final label application state by applying a force on the applicator tool. The applicator tool, in turn, directs the hub downwardly such that the disk-receiving surface is substantially level with the label plate.

During use, then, the applicator tool is disassembled from the alignment post, and a label is coaxially placed over the alignment post and onto the label plate. In this regard, an adhesive side of the label is faced opposite the label plate. A CD is then coaxially positioned about the alignment post, with the side of the CD to receive the label resting against the disk-receiving surface of the hub. Finally, the applicator tool is assembled over the disk-receiving surface to the initial label application state. Subsequently, a downward force is placed on the applicator tool, thereby directing the hub, and thus the CD, downwardly, such that the disk-receiving surface is substantially level with the label plate. In this final label application state, the CD contacts the adhesive side of the label, thereby applying the label to the CD. In one preferred embodiment, the kit further includes a pack of label sheets stored within the base. In another preferred embodiment, the kit further includes a writing utensil selectively secured to the cover.

Another aspect of the present invention relates to a method of applying a label to a CD. The method includes providing an applicator kit including a cover and a support device. The cover includes an outer wall and a label plate opposite the outer wall and forming an opening. The support device includes an alignment post extending from the outer wall through the opening, a hub slidably disposed about the alignment post, and a spring biasing the hub to a raised position. In this regard, the label plate deflects upwardly away from the outer wall at the opening. A label is placed about the hub and onto the label plate. A CD is then placed about the alignment post and onto the hub. Finally, the CD and the hub are forced toward the label plate. Due to the deflected nature of the label plate, initial contact between the CD and the label occurs at respective inner diameters thereof. With further forced movement of the CD and hub toward the label plate, the surface area interface between the CD and the label increased laterally outwardly until the label is entirely adhered to the CD. In this way, any air otherwise existing between the label and the CD is forced outwardly, such that upon final application, no air bubbles or creases are formed in the label.

BRIEF DESCRIPTION OF THE DRAWINGS

FIGS. 7 and 8 illustrate application of a label to a CD using the kit of FIG. 1.

DESCRIPTION OF THE PREFERRED EMBODIMENTS

Figure 1:
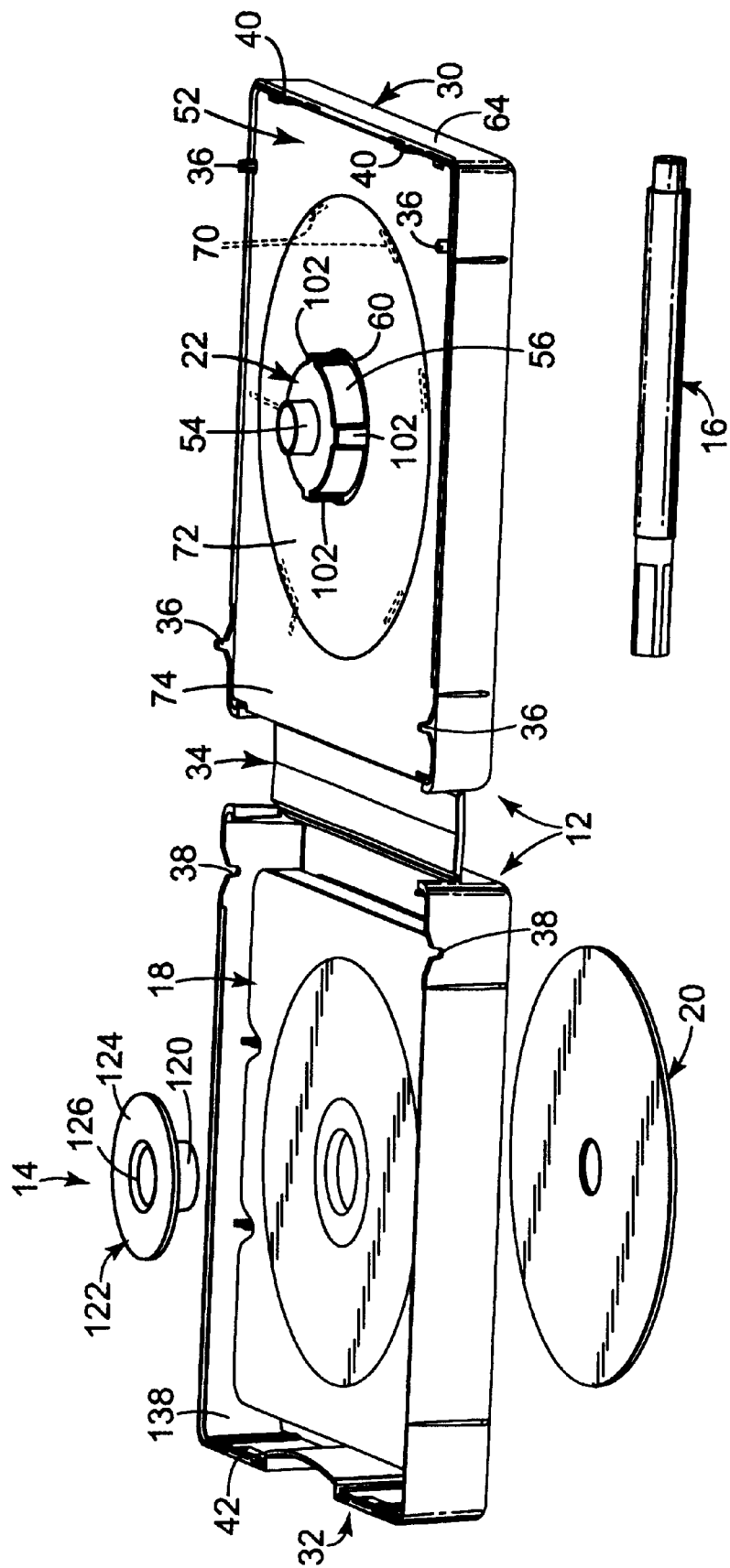
FIG. 1 is a perspective, partially exploded view of a CD label applicator kit in accordance with the present invention.

One preferred embodiment of a CD label applicator kit 10 is provided in FIG. 1. The kit 10 includes a case 12, an applicator tool 14, a writing utensil 16, a label sheet pack 18, and a software disk 20. The various components are described in greater detail below. In general terms, however, the case 12 provides a support device 22 (referenced generally in FIG. 1) configured to facilitate application of a label (not specifically shown, but provided by the label sheet pack 18) to a CD (not shown) in conjunction with the applicator tool 14. Further, the applicator tool 14, the pen 16, the label sheet pack 18 and the software disk 20 are selectively maintainable by or within the case 12 such that the kit 10 is easily handled by a user (not shown), and provides all necessary components for labeling a CD.

The case 12 includes a cover 30 and a base 32. The cover 30 and the base 32 are preferably hingedly connected to one another, such as by a hinge 34. In a preferred embodiment, the cover 30 and the base 32 are formed from a plastic material, providing the hinge 34 as a "living hinge". Regardless, the case 12 is transitionable from an open state (as illustrated in FIG. 1) to a closed state in which the cover 30 and the base 32 are fully assembled to one another. In this regard, and in one preferred embodiment, the cover 30 further includes a plurality of alignment tabs 36, whereas the base 32 forms a plurality of corresponding apertures 38. Where the hinge 34 is a living hinge, interaction between the tabs 36 and the apertures 38 upon closing of the case 12 guides the cover 30 into alignment with the base 32. In an even more preferred embodiment, the cover 30 includes retention tabs 40 and the base 32 forms corresponding slots 42 the interaction of which preferably provides a "snap-together" feature by which the cover 30 and the base 32 are secured to one another in the closed position.

Figure 2:
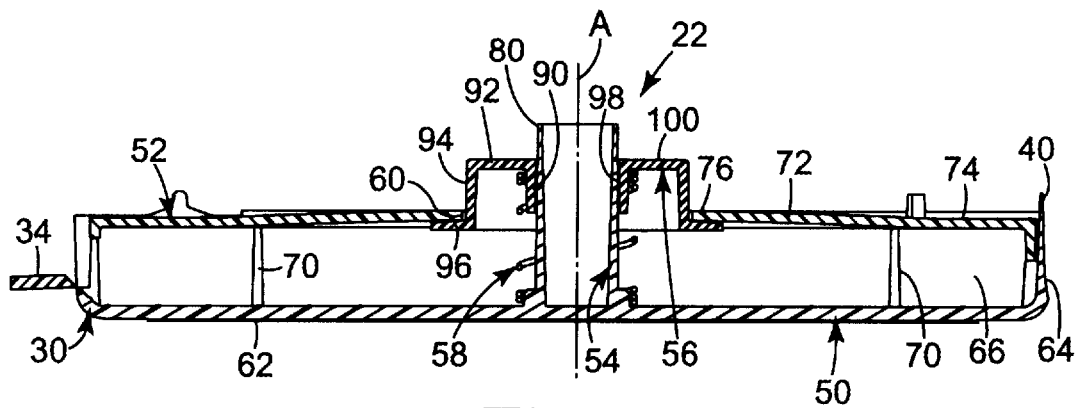
FIG. 2 is an enlarged, cross-sectional view of a cover portion of the kit of FIG. 1.

The cover 30 is shown in greater detail in FIG. 2 and includes an outer wall 50 and a label plate 52. The support device 22 is formed by or within the cover and includes an alignment post 54, a hub 56, and a spring 58. In general terms, the label plate 52 is positioned opposite the outer wall 50 and forms an opening 60. The alignment post 54 extends from the outer wall 50 through the opening 60. The hub 56 is coaxially received over the alignment post 54, and is biased to a raised position (shown in FIG. 2) via the spring 58.

The outer wall 50 defines an exterior surface 62 of the cover 30, and is connected to, or integrally formed with, a portion of the living hinge 34. Further, with additional reference to FIG. 1, a sidewall 64 extends from, and is preferably integrally formed with, the outer wall 50, defining a perimeter of the cover 30. Thus, the outer wall 50 and the sidewall 64 combine to define an interior 66 of the cover 30.

The label plate 52 is positioned within the interior 66, and is spaced from the outer wall 50 as best shown in FIG. 2. In one preferred embodiment, a plurality of support ribs 70 extend from the outer wall 50 and support the label plate 52 relative to the outer wall 50. Preferably, the label plate 52 is physically secured to two or more of the support ribs 70, such as by an ultrasonic weld. Regardless, the support ribs 70 are radially spaced from a central axis A defined by the opening 60. As described in greater detail below, the support ribs 70 preferably define a deflection point for the label plate 52. Regardless, as shown by dashed lines in FIG. 1, the support ribs 70 are circumferentially spaced at a radius (relative to the central axis A) approximating, or greater than, a radius of a standard CD (not shown). Thus, in one preferred embodiment, each of the support ribs 70 are radially spaced from the central axis A at a distance of at least 2.32 inches. Alternatively, other locations can be employed. Even further, the label plate 52 can be maintained relative to the outer wall 50 by a number of other connection techniques.

The label plate 52 is preferably configured to be relatively rigid yet flexible or deflectable, and is biased to a deflected state in the raised position of FIG. 2. More particularly, and as illustrated in FIG. 2, the label plate 52 is generally defined by an inner region 72 and an outer region 74. The inner region 72 includes the opening 60 and extends to the point of contact with the respective support ribs 70. Conversely, the outer region 74 extends laterally outwardly from the respective support ribs 70 to a perimeter of the label plate 52. With these definitions in mind, in the raised position of FIG. 2, the label plate 52 is preferably formed such that the inner region 72 is deflected relative to a nominal, flat orientation of the outer region 74. That is to say, the outer region 74 is substantially planar with a horizontal plane defined by the outer wall 50. The inner region 72 extends inwardly from the outer region 74 and is biased to deflect upwardly. This upward deflection of the inner region 72 relative to the flat outer region 74 imparts a dome-like shape to the label plate 52. In the raised position, maximum extension relative to the outer nominal, flat plane of the outer region is found at a perimeter 76 of the opening 60. Relative to the nominal, flat plane defined by the outer region 74, the perimeter 76 of the inner region 72 is preferably 0.02–0.05 inch above the outer region 74 in the raised position of FIG. 2. As described below, during a label application operation, the inner region 72 will deflect downwardly (or toward the outer wall 50) in response to a user-applied (downward) force. To this end, the flexible nature of the label plate 52 allows the inner region 72 to preferably deflect or flex below the nominal flat plane defined by the outer region 74 such that the perimeter 76 can travel or flex a distance on the order of 0.25 inch.

While the inner region 72 has been illustrated as forming a relatively linear, angular extension from the outer region 74 (in the transverse cross-sectional view of FIG. 2), other configurations are equally acceptable. For example, the inner region 72 can be curved in transverse cross-section. Even further, the outer region 74 can also be angularly disposed relative to a horizontal plane of the outer wall 50. Preferably, the inner region 72 defines an outer diameter corresponding with, or slightly greater than, an outer diameter of a standard CD. The inner region 72 further defines an inner diameter at the perimeter 76 of the opening 60. In the initial label application state of FIG. 2, the inner region 72 deflects upwardly from the outer diameter to the inner diameter.

The alignment post 54 extends from the outer wall 50 and is coaxially positioned relative to the opening 60 in the label plate 52. In this regard, the alignment post 54 defines a leading end 80 projecting to a height above the label plate 52 (relative to the orientation of FIG. 2). Further, the alignment post 54 defines a radius corresponding with a radius of a center hole of a standard CD (not shown). Thus, in one preferred embodiment, the alignment post 54 forms a diameter of approximately 0.580 inch. Finally, in the preferred embodiment, the alignment post 54 is permanently affixed to the outer wall 50. For example, the alignment post 54 is preferably integrally formed with the outer wall via a plastic injection operation. Regardless, the alignment post 54 remains stationary during a label application as described below.

The hub 56 includes an inner section 90, a shoulder 92, an outer section 94, and a flange 96. The inner section 90 defines a post-receiving surface 98 configured slidably engage the alignment post 54. The shoulder 92 defines a disk-receiving surface 100 configured to contact a CD (not shown). The outer section 94 is cylindrical, defining a diameter slightly less than a diameter of the opening 60 in the label plate 52. Finally, the flange 96 extends radially outwardly from the outer section 94 and is configured to selectively contact the label plate 52 as shown in FIG. 2. Upon final assembly, then, the hub 56 is slidable along the alignment post 54 via the post-receiving surface 98. Further, interaction between the flange 96 and the label plate 52 prevents the hub 56 from disengaging the label plate 52 in the raised position of FIG. 2. In one preferred embodiment, and as best shown in FIG. 1, the outer section 94 defines a plurality of radial extensions 102. The radial extensions 102 extend to a radius approximating a radius of the opening 60, whereas a remainder of the outer section 94 is radially spaced from the perimeter 76 of the label plate 52 upon final assembly. With this one preferred configuration, the radial extensions 102 provide a guide surface for uniformly directing the hub 56 relative to the opening 60. However, the additional spacing between a remainder of the outer section 94 and the perimeter 76 prevents the hub 56 from sealing against the label plate 52, and promotes airflow therebetween as the hub 56 is lowered, thereby facilitating a label application procedure. The radial extensions 102 are preferably equidistantly spaced about the hub 56 so as to alleviate cantilevering effects when the hub 56 is pressed downwardly.

The spring 58 is preferably a compression spring sized to be coaxially received about the alignment post 54 as well as the inner section 90 of the hub 56. Upon final assembly, and as shown in FIG. 2, the spring 58 is secured adjacent the outer wall 50 and imparts an upward force onto the hub 56 at the shoulder 92. With this configuration, then, the spring 58 biases the hub 56 to the raised position of FIG. 2.

While the cover 30 and the support device 22 have been described as being separate components, it will be recognized that the support device 22 is effectively part of the cover 30. To this end, the alignment post 54 is preferably integrally formed with the outer wall 50, and the hub 56 and the spring 58 are captured by the label plate 52.

Figure 3:
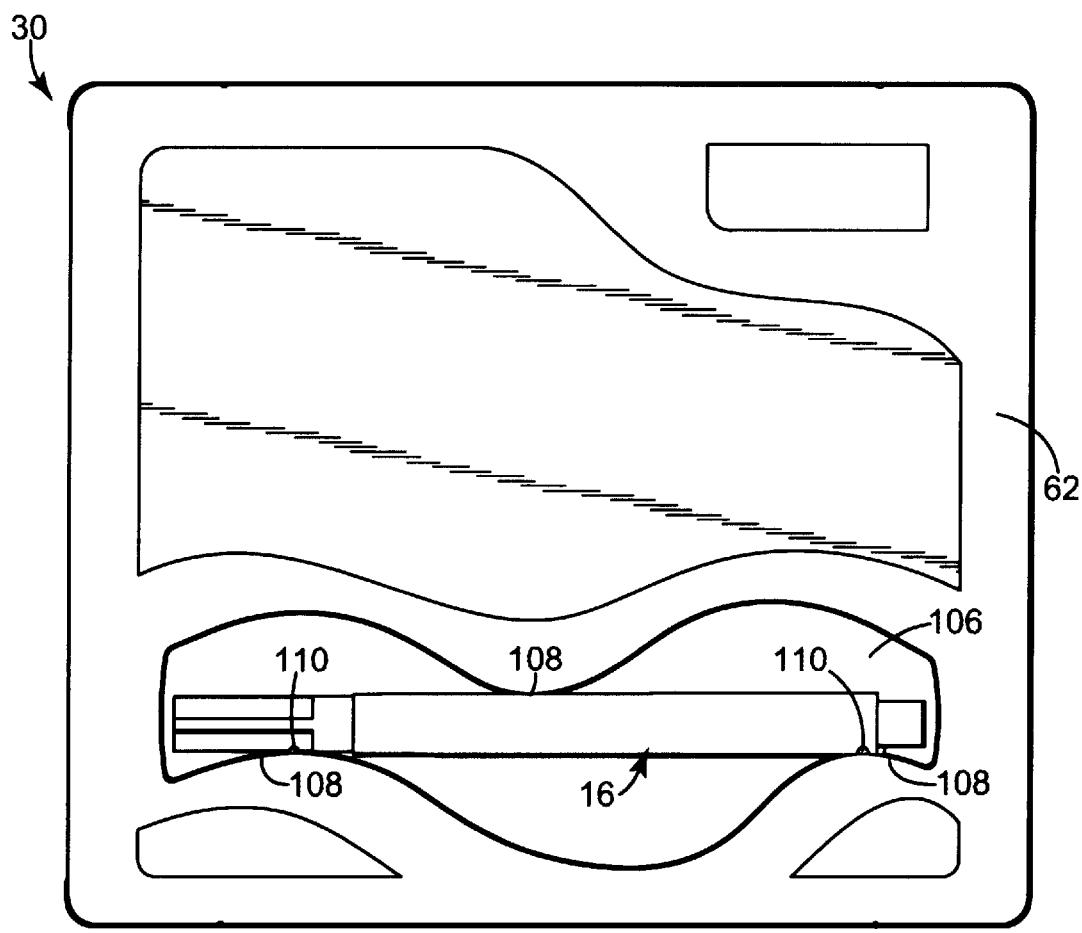
FIG. 3 is a bottom view of the cover portion of FIG. 2.

An additional preferred feature of the cover 30 is illustrated in FIG. 3. More particularly, the exterior 62 of the outer wall 50 forms a slot 106. The slot 106 is configured to selectively receive and maintain the writing utensil 16. Thus, in one preferred embodiment, the slot 106 has a curved configuration, defining opposing abutment surfaces 108. As shown in FIG. 3, the abutment surfaces 108 contact and retain the writing utensil 16. To further promote retention of the writing utensil 16, one or more tines 110 can be included.

Returning to FIG. 1, the applicator tool 14 includes a handle 120 and a flange 122. The flange 122 extends radially from the handle 120 and defines a disk contact surface 124. Further, the handle 120 and the flange 122 combine to define a passage 126. The passage 126 is sized in accordance with a diameter of the alignment post 54 such that the applicator tool 14 can be coaxially positioned over the alignment post 54. As described in greater detail below, the applicator tool 14 facilitates a label application procedure while protecting the CD (not shown) from direct contact with a user's hand.

Figure 4:
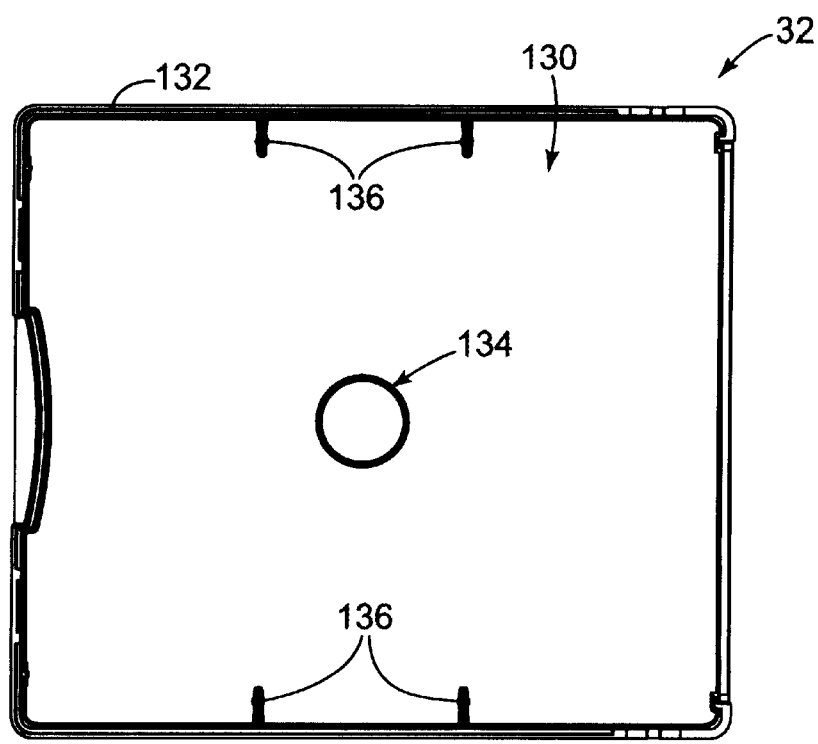
FIG. 4 is a top view of a base portion of the kit of FIG. 1.

The base 32 is illustrated with the label sheet pack 18 removed therefrom in the view of FIG. 4. In general terms, the base 32 includes a bottom wall 130, a sidewall 132, a ring 134, and tabs 136. The sidewall 132 extends upwardly (out of the page of FIG. 4) from a perimeter of the bottom wall 130. Thus, the bottom wall 130 and the sidewall 132 combine to define an interior 138 (best shown in FIG. 1) of the base 32. With this in mind, the ring 134 and the tabs 136 extend upwardly from the bottom wall 130, within the interior 138.

The ring 134 is substantially centrally located relative to the bottom wall 130 and defines an inner diameter sized to selectively maintain the applicator tool 14 (FIG. 1). More particularly, and as described in greater detail below, when the kit 10 is not in use, the handle 120 (FIG. 1) of the applicator tool 14 nests within the ring 134. In this regard, a position of the ring 134 relative to the base 32 corresponds with a position of the alignment post 54 (FIG. 1) relative to the cover 30 (FIG. 1) such that upon placement of the cover 30 over the base 32, the alignment post 54 is coaxially aligned with the ring 134, and thus the applicator tool 14 disposed therein. In this way, the applicator tool 14 is conveniently maintained within the case 12 (FIG. 7) in a closed position. Finally, as described below, an outer diameter of the ring 134 is preferably sized to be received within a hole of the various labels 18 (FIG. 1).

Figure 5:
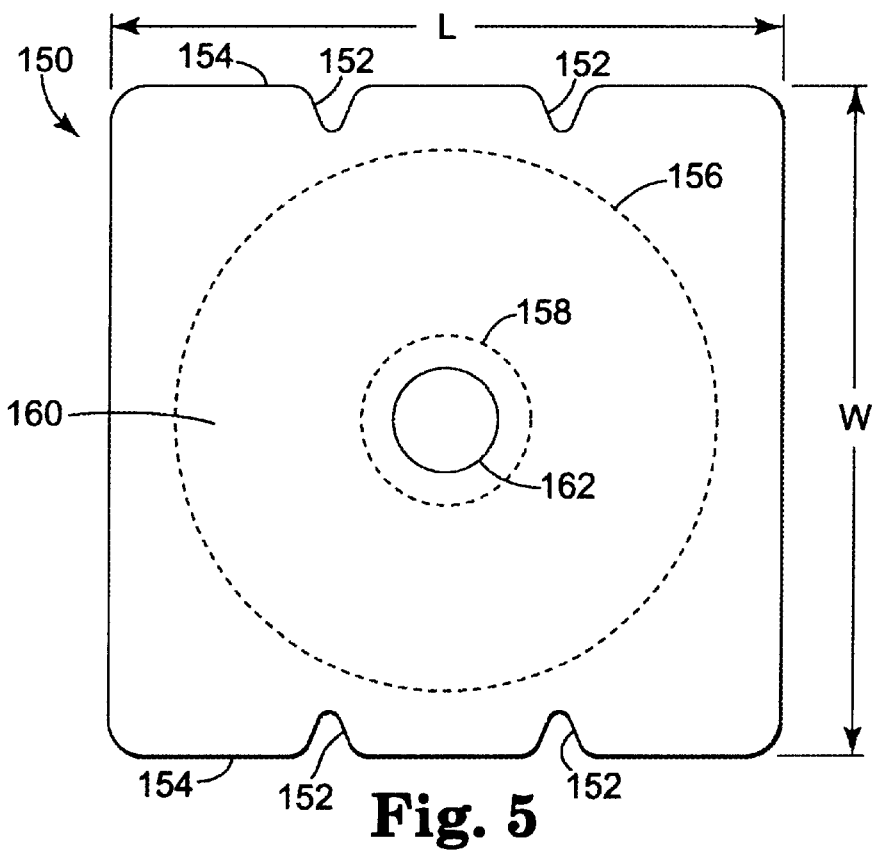
FIG. 5 is a top view of a label sheet useful with the kit of FIG. 1.

The tabs 136 support the sidewall 132 and are configured to clear a corresponding portion of the label sheet pack 18 (FIG. 1). In this regard, FIG. 5 depicts a top view of one preferred embodiment of one label sheet 150 otherwise provided with the label sheet pack 18. The label sheet 150 is generally comprised of an adhesive-backed label layer (the outer surface of which is shown in FIG. 5) and a release liner layer (not shown). Unlike standard CD label sheets that are 8½×11 inches, the one preferred label sheet 150 corresponds generally with an A5 paper size. That is to say, the label sheet 150 preferably has a length (L) of at least approximately 5.827 inches (148 mm), and a width (W) of approximately 5.827 inches (148 mm). The label sheet 150 is therefore a relatively linear sided square or rectangle, with the preferred length (L) providing additional surface area for grasping by a printer, yet is small enough to be stored within a relatively small case. Further unlike one other available label sheet that is circular, having a diameter of approximately 5.1 inches, the relatively linear sides and increased length and width of the preferred label sheet 150 greatly facilitates handling by most available printers. Alternatively, other dimensions, both length (L) and width (W) are available. For example, the relatively linear sides can define a width (W) of at least 5.827 inches (148 mm) but less than 8.5 inches (215 mm), and a length of at least 5.827 inches (148 mm) but less than 11 inches (279 mm). Further, notches 152 are formed at opposing sides 154 of the sheet 150. The location of the notches 152 corresponds with the tabs 136 provided by the base 32. Thus, in one preferred embodiment, each notch is centered approximately 1 inch from a center line of the label sheet 150. Alternatively, other dimensions are acceptable.

The label sheet 150 includes an outer cut pattern 156 and an inner cut pattern 158. The cut patterns 156, 158 facilitate removal of a label 160 from the release liner (not shown) following printing. Thus, the outer and inner cut patterns 156, 158 correspond in diameter with accepted CD label dimensions. For example, the outer cut pattern 156 defines a diameter approximately 4.64 inches, whereas the inner cut pattern 158 defines a diameter of approximately 1.61 inches. In addition, and in one preferred embodiment, the label sheet 150 includes a center hole 162 cut through an entirety of a label sheet 150 (i.e., cut through both the label layer and the release liner layer). The center hole 162 preferably has a diameter corresponding with the ring 134 (FIG. 4) that is less than that defined by the inner cut pattern 158. For example, in one preferred embodiment, the center hole 162 is cut to a diameter of approximately 0.91 inch. By providing additional material between the center hole 162 and the inner cut pattern 158, potential printer complications can be prevented. As a point of reference, the related print software will restrict a user from attempting to print information at the area radially within the inner cut pattern 158. However, it is common for certain printers, especially inkjet printers, to spray ink beyond a desired location (referred to as "overspray"). Thus, although the user cannot instruct the printer to print radially within the inner cut pattern 158, inherent limitations of the printer may, in fact, cause ink to spray in that area. If the center hole 162 were formed at the inner cut pattern 158, an opportunity would exist for ink to spray through the center hole 162, possibly damaging the printer. By forming the center hole 162 to a smaller diameter as compared to the inner cut pattern 158, this potential overspray concern is avoided, as additional surface area is provided to receive the overspray ink.

Figure 6:
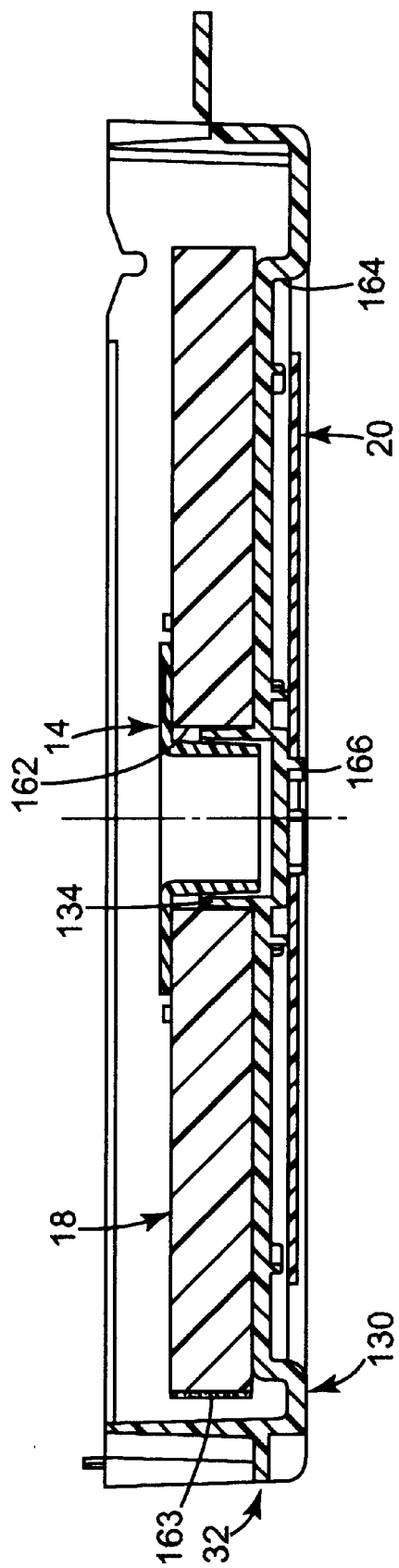
FIG. 6 is a cross-sectional view of the bottom portion of the kit of FIG. 1.

The label sheet pack 18 is shown secured within the base 32 in FIG. 1. As shown, the tabs 136 are received within the notches 152. Further, as shown in FIG. 6, the center holes 162 of the various label sheets 150 comprising the label pack 18 are received over the ring 134. In one preferred embodiment, the various label sheets 150 are glued to one another on one side thereof (generally referenced at 163) so as to render the label sheet pack 18 more conducive to being maintained within the base 32. FIG. 6 further illustrates the applicator tool 14 nested within the ring 134. Preferably, the handle 120 of the applicator tool 14 is slightly smaller than an inner diameter of the ring 134, such that the handle 120 easily fits within the ring 134.

Finally, FIG. 6 illustrates another preferred feature of the base 32 in which the bottom wall 130 forms a recess 164. Retention ribs 166 are formed within the recess 164. With this one preferred configuration, the software disk 20 is secured within the recess 164 via engagement with the retention ribs 166. As is known in the art, the software disk 20 facilitates printing of desired information onto a label sheet by a user.

Returning to FIG. 1 and as previously described, when not in use, the kit 10 is closed, with the cover 30 secured to the base 32. The applicator tool 14 and the label sheet pack 18 are secured within the so-formed case 12. Further, the writing utensil 16 and the software disk 20 are also secured to the case 12 via the cover 30 and the base 32, respectively. Thus, the kit 10 is streamlined, maintaining all necessary components for performing a CD label application in a highly convenient, transportable structure.

Use of the kit 10 to perform a CD label application operation is illustrated in FIGS. 7 and 8. With specific reference to FIG. 7, the base 32 (FIG. 1) is removed from the cover 30, with the hub 56 being biased to the raised position shown. A printed label 160 (otherwise removed from the label sheet 150 (FIG. 5) as previously described) is coaxially disposed over the hub 56 and placed onto the label plate 52 at the inner region 72 thereof. In this regard, the printed side of the label 160 contacts the label plate 52, whereas an adhesive side faces outwardly. A CD 170 is coaxially positioned about the alignment post 54 and placed onto the disk-receiving surface 100 of the hub 56. Finally, the applicator tool 14 is coaxially positioned over the alignment post 54 such that the disk contact surface 124 rests on top of the CD 170. As a point of reference, the configuration FIG. 7 (in which various components, along with the label 160 and the CD 170, are assembled) is hereinafter referred to as the "initial label application state" of the kit 10.

Once the kit 10 has been assembled to the initial label application state of FIG. 7, the label 160 can then be applied to the CD 170. As a point of reference, the CD 170 includes an outer surface 172 and a data surface 174. In general terms, the outer surface 172 does not contain data, and therefore can receive the label 160. Conversely, however, the data surface 174 has been formatted with data, and therefore, could be damaged by direct contact with a user's hand (not shown), for example, by oils or other contaminants on the user's hand. The applicator tool 14 affords the user the ability to perform the label application procedure without directly contacting the CD 170. In particular, a user is able to grasp the applicator tool 14 at the handle 120, with the flange 122 preventing the user's fingers from contacting the CD 170.

Regardless, the kit 10 is transitioned from the initial label application state of FIG. 7 to a final label application state of FIG. 8 by applying a downward force onto the applicator tool 14. This action, in turn, forces the CD 170 and the hub 56 downwardly toward the label plate 52, by overcoming the bias of the spring 58. During this downward motion, due to the preferred deflected or domed shape provided by the inner region 72 of the label plate 52, the CD 170 will initially contact the label 160 at an inner diameter thereof. The deflectable nature of the label plate 52 allows the inner region 72 to compress downwardly (or toward the outer wall 50) with further downward movement of the applicator tool 14, thereby allowing additional surface area interaction, and thus engagement, between the CD 170 and the label 160. This zone of interaction continues to increase radially outwardly with further downward movement of the CD 170, effectively forcing out any air otherwise existing between the CD 170 and the label 160. As a result, air will not undesirably become entrapped between the label 160 and the CD 170, and the label 160 will not crease. At the final label application state of FIG. 8, the label 160 is fully adhered to the CD 170. While the label plate 52 is depicted as being flat in the final label application state, the flexible nature of the label plate 52 allows the inner region 72 to flex below the nominal, horizontal plane of the outer region 74. For example, in one preferred embodiment, the kit 10 is preferably configured to provide a vertical travel distance of the hub 56 and the label plate 52 at the opening 60 of 0.25 inch. Once the label 160 has been applied, the applicator tool 14 is then retracted from the alignment post 54. Similarly, the CD 170 is removed from the hub 56. Subsequently, another CD (not shown) can be labeled or the kit 10 returned to a closed position in which the applicator tool 14 is maintained by the base 32 (FIG. 1).

The CD label applicator kit of the present invention provides a marked improvement over previous designs. The kit itself includes a single case that maintains all necessary components for performing a label application operation, including an applicator tool, labels, a writing utensil, and disk software. In addition, the kit is preferably configured to promote consistent, uniform application of a label to a CD without the formation of air bubbles or creases.

Although the present invention has been described with reference to preferred embodiments, workers skilled in the art will recognize that changes can be made in form and detail without departing from the spirit and scope of the present invention. For example, while the kit has been described as preferably including an applicator tool, a labeling operation may be carried out by a user without the applicator tool.

What is claimed is:

1. A method for applying a label to a CD, the method comprising:
   providing an applicator kit including a housing and a support device, the housing including an outer wall and a label plate opposite the outer wall and forming an opening, the support device including an alignment post extending from the outer wall through the opening, a hub slidably disposed about the alignment post, and a spring biasing the hub to a raised position, wherein the label plate is biased to assume an initial deflection position in which a perimeter of the opening is raised relative to an adjacent portion thereof;
   placing a label about the hub and onto the label plate;
   placing a CD about the alignment post and onto the hub; and
   forcing the CD and the hub toward the label plate such that an inner diameter of the CD initially contacts an inner diameter of the label due to the deflected nature of the rebel plate;
   wherein with further forced movement of the CD and the hub toward the label plate, a surface area interface between the CD and the label increases radially outwardly, thereby forcing out air from between the C.D. and the label.

2. The method of claim 1, further comprising:
   positioning an applicator tool about the alignment post and onto the CD; and
   using the applicator tool to apply a force onto the CD.

3. The method of claim 1, wherein the label plate includes an inner region forming the opening and an outer region defining a nominal, flat plane, and further wherein forcing the CD and the hub toward the label plate includes deflecting at least a portion of the inner region below the plane of the outer region.

4. The method of claim 1, wherein the label plate defines an inner region and an outer region, the outer region being rigidly supported relative to the outer wall, and further wherein forcing the CD and the hub toward the label plate includes deflecting the inner region relative to the outer region.

5. The method of claim 4, wherein in the initial deflection position, the inner region extends above the outer region, and further wherein forcing the CD and the hub toward the label plate includes deflecting at least a portion of the inner region below the outer region.

6. The method of claim 1, wherein in the initial deflection position, the inner region of the label plate is characterized by a radially uniform outward deflection relative to the outer wall, and further wherein the step of further forced movement of the CD and the hub toward the label plate is characterized by the label plate uniformly resisting advancement of the CD relative to a circumference thereof.

7. A CD label applicator comprising:
   a housing including:
      an outer wall,
      a label plate maintained opposite the outer wall and forming an opening,
      wherein the label plate is biased to assume an initial deflection position in which a perimeter of the opening is raised relative to an a adjacent portion thereof; and
   a support device including:
      an alignment post extending from the outer wall outwardly through the opening and beyond the label plate, the alignment post being sized to be received within a center hole of a CD,
      a hub slidably disposed about the alignment post and defining a disk receiving surface,
      a spring biasing the hub to a raised position in which the disk receiving surface is above the label plate;
   wherein the applicator is configured such that during use, a label is placed on the label plate and a CD is placed on the disk receiving surface, and as the CD is forced toward the label plate, a surface area interface between the CD and the label increases radially outwardly, thereby forcing air from between the CD and the label.

8. The applicator of claim 7 wherein the label plate further includes an inner region forming the opening and an outer region defining a nominal, flat plane, and further wherein the applicator is configured such that at least a portion of the inner region is deflectable below the plane of the outer region during a label application operation.

9. The applicator of claim 7, wherein the label plate includes an inner region forming the opening and an outer region, the outer region being rigidly supported relative to the outer wall, and further wherein the applicator is configured such that the inner region is deflectable relative to the outer region during a label application operation.

10. The applicator of claim 9, wherein in the initial deflection position, the inner region extends above the outer region, the label plate being configured such that at least a portion of the inner region is deflectable below the outer region during a label application operation.

11. The applicator of claim 7, wherein the label plate is configured to uniformly deflect in a radial direction relative to the alignment post during a label application operation.

12. The applicator of claim 7, wherein the label plate is configured to be deflectable relative to a horizontal plane.

13. The applicator of claim 7, wherein the label plate is defined by an inner region, forming the opening, and an outer region, and further wherein in the initial deflection position, the inner region is deflected relative to the outer region.

14. The applicator of claim 13, wherein a spacing between the label plate end the outer wall in the initial deflection position is greater at the inner region than at the outer region.

15. The applicator of claim 13, wherein in the initial deflection position, a deflected orientation of the inner region positions a perimeter of the opening 0.02–0.05 inch above a plane defined by the outer region.

* * * * *